US009858296B2

(12) United States Patent
Gupta et al.

(10) Patent No.: US 9,858,296 B2
(45) Date of Patent: Jan. 2, 2018

(54) REPRESENTATIVE IMAGE SELECTION FOR IMAGE MANAGEMENT USING FACE RECOGNITION

(71) Applicant: Adobe Systems Incorporated, San Jose, CA (US)

(72) Inventors: Angad Kumar Gupta, Ghaziabad (IN); Alok Kumar Singh, Noida (IN); Ram Prasad Purumala, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 44 days.

(21) Appl. No.: 15/086,642

(22) Filed: Mar. 31, 2016

(65) Prior Publication Data

US 2017/0286452 A1    Oct. 5, 2017

(51) Int. Cl.
*G06K 9/00* (2006.01)
*G06F 17/30* (2006.01)
*G06T 7/00* (2017.01)

(52) U.S. Cl.
CPC .... *G06F 17/30265* (2013.01); *G06F 17/3028* (2013.01); *G06F 17/30256* (2013.01); *G06K 9/00288* (2013.01); *G06T 7/0028* (2013.01); *G06T 2207/30168* (2013.01)

(58) Field of Classification Search
USPC ........................................................ 382/118
See application file for complete search history.

(56) References Cited

U.S. PATENT DOCUMENTS

| | | | | |
|---|---|---|---|---|
| 2002/0136435 A1* | 9/2002 | Prokoski | ............ | G06K 9/00221 382/118 |
| 2008/0192991 A1* | 8/2008 | Gremse | .............. | G06K 9/00288 382/118 |
| 2011/0129126 A1* | 6/2011 | Begeja | ............... | G06K 9/00295 382/118 |
| 2014/0226888 A1* | 8/2014 | Skidmore | ............ | A61B 5/4064 382/131 |
| 2015/0264253 A1* | 9/2015 | Takagi | ............... | H04N 5/23293 348/333.11 |
| 2015/0341549 A1* | 11/2015 | Petrescu | ............ | H04N 5/23222 348/207.1 |
| 2016/0171345 A1* | 6/2016 | Ragusa | ................. | G06T 7/0014 382/128 |
| 2017/0147806 A1* | 5/2017 | McFarland | ............. | G06F 21/32 |
| 2017/0150064 A1* | 5/2017 | Mayer | .................... | H04N 5/265 |

* cited by examiner

*Primary Examiner* — Jerome Grant, II
(74) *Attorney, Agent, or Firm* — Finch & Maloney PLLC

(57) ABSTRACT

A technique for selecting a representative image from a group of digital images includes extracting data representing an image of a face of a person from each image in the group using a face recognition algorithm, determining a score for each image based on one or more quality parameters that are satisfied for the respective image, and selecting the image having the highest score as the representative image for the group. The quality parameters may be based on any quantifiable characteristics of the data. Each of these quality parameters may be uniquely weighted, so as to define the relative importance of one parameter with respect to another. The score for determining the representative image of the group may be obtained by adding together the weights corresponding to each quality parameter that is satisfied for a given image. Once selected, the representative image may be displayed in a graphical user interface.

17 Claims, 5 Drawing Sheets

REPRESENTATIVE IMAGE SELECTION FOR IMAGE MANAGEMENT USING FACE RECOGNITION

FIELD OF THE DISCLOSURE

This disclosure relates generally to the field of digital image processing, and more particularly, to techniques for automatically selecting a best representative image among a set of images grouped using face recognition.

BACKGROUND

There are a number of photo management applications that provide solutions for organizing, previewing, editing and managing collections of images of people. Some of these applications employ face detection and recognition techniques to assist users with the organization and management of the images. For instance, face recognition systems can be used to locate the face of a person within an image that may include other objects or people. In some cases, such systems can further analyze the face in one image and match it to the face of the same person in other images. For example, selected facial features of a person may be extracted from a given image and compared to the facial features extracted from other images in a database of known faces. A number of non-trivial issues are associated with managing and organizing digital images, particularly when face recognition is used.

When using a photo management application to organize and manage images of people, there may be instances where it is desirable to group the photos together so that a given subject appears in every photo of the group. Such groupings allow a user to more easily locate all photos containing the given subject. Separate groups of photos may be created for every subject appearing in the set of photos. Once the photos are grouped, one photo in each group may be selected to represent all of the photos in the group. For example, the representative photo may be a portrait or head shot of the subject appearing in the all of the photos in the group. The representative photo may be displayed in a GUI of the photo management application so that the user can easily locate all of the photos of that subject. However, the quality of photographs typically varies such that some photos are more visually or aesthetically appealing than others. For example, some photos may be dark, blurry, off-center, or otherwise include aesthetically displeasing qualities, such as poor facial expressions, uneven exposure, or harsh colors. Such low quality photos may not be suitable for use as a representative photo for visual or aesthetic reasons, especially when the group includes better quality photos that could instead be used as representative photos.

When a user manually selects the representative photo for a group of photos, the user will typically choose the best photo of the group, such as the photo that has the best combination of exposure, color, facial expression, focus and resolution. It is also possible to automatically select the representative photo so that the user does not have to select it manually. However, automatically selecting the best or most representative photo is not a simple task. For example, a suboptimal algorithm may merely choose the photo that is the oldest in the group, newest in the group, or most recently added in the group, without considering any of the visual or aesthetic qualities of the photo. As a result, such algorithms may select, as the representative image, a photo that does not necessarily have the best combination of attributes among all of the photos in the group.

DETAILED DESCRIPTION

Figure 1:
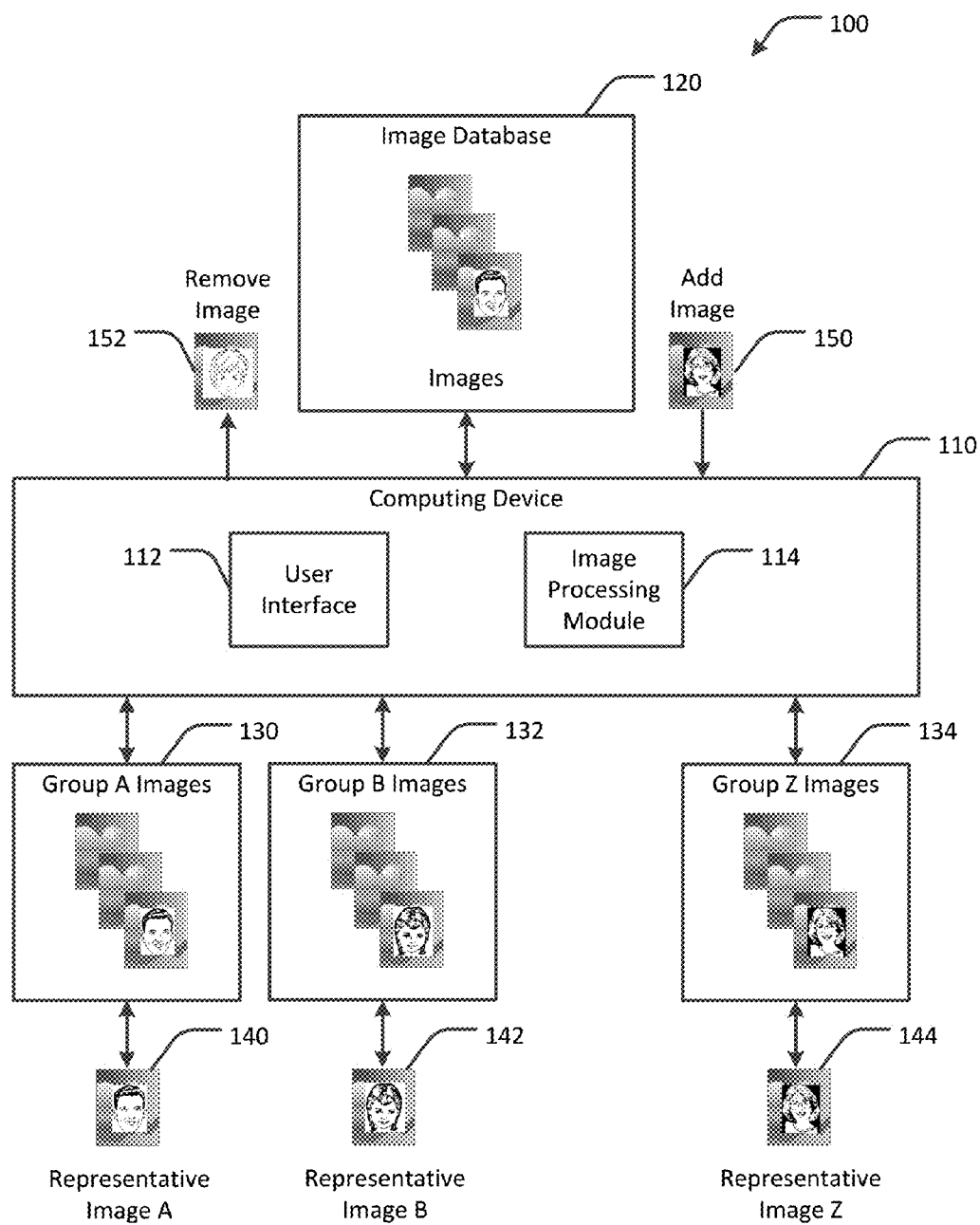
FIG. 1 illustrates an example system for selecting a representative image from a group of digital images, in accordance with an embodiment of the present disclosure.

In accordance with an embodiment of the present disclosure, one computer-implemented technique for selecting a representative image from a group of digital images includes extracting data representing an image of a face of a person from each image in the group (e.g., using a face recognition or detection algorithm), determining a score for each image based on one or more quality parameters that are satisfied for the data extracted from the respective image, and selecting the image having the highest score as the representative image for the group. The quality parameters, which are discussed in further detail below, may be based on any quantifiable characteristics of the image data, such as the quality of the exposure, the gray scale profile, image resolution, facial expressions (e.g., eyes open, mouth closed), sharpness of the captured facial features, and the number of faces in the image. In some embodiments, each of the given quality parameters may be uniquely weighted so as to define the relative importance of one parameter with respect to another. The score for determining the representative image of the group may be obtained by adding together the weights corresponding to each quality parameter that is satisfied for a given image, and excluding the weights of the unsatisfied parameters. Once selected, the representative image may be displayed, for example, as an icon or element in a graphical user interface configured to provide user access to the images in the group. Numerous configurations and variations will be apparent in light of this disclosure.

The techniques for selecting a representative face as variously described herein may be used, for example, in a face recognition or face matching workflow within a photo management application, such as a photo editing or cataloging system. For instance, a photo management application can use face detection and face recognition algorithms to help users organize images of various people. Such organization includes grouping images by person (some images may fall into more than one group if, for example, more than one person is in the image). Image data may, for example, be extracted from the image using a face recognition algorithm that is configured to identify a region of an image in which a face appears or several regions if several faces are in the image. The face recognition algorithm may be further configured to associate the face with a particular person, so that different images of the same person can be grouped together if the images are not already so grouped. However, in some cases, the grouping can be performed in other ways, such as automatic grouping based on face matching algorithm (where the identity of the person in a given photo isn't necessarily 'recognized' or known, but the person in that photo is confirmed to be the person in another photo), manual grouping by the user, or using metadata (e.g., photos tagged by a user, or by a classification process) that identifies the person in the image. For example, in a set of photos of Person A and Person B, all photos of Person A may be grouped into Group A and all photos of Person B may be grouped into Group B. A representative photo of Person A, taken from Group A, may be displayed in a graphical user interface (GUI) of the photo organizing application so that a user of the photo management application can readily see which person is in the photos of Group A. Likewise, a representative photo of Person B, taken from Group B, may be displayed in the GUI. An image from each group may then be selected as a representative for the group based on one or more quality parameters associated with the image, such as discussed in the previous paragraph.

System Architecture

FIG. 1 illustrates an example system 100 configured to select a representative image from a group of digital images, in accordance with an embodiment of the present disclosure. The system 100 includes a computing device 110 and an image database 120 operatively coupled to the computing device 110. The image database 120 is configured to store one or more images. In particular, at least some of the images include photographs of people's faces, although other photographic subjects may be represented as well. The computing device 110 may include, for example, an image processing application, such as Adobe Lightroom or Photoshop. Further, the computing device 110 may include, for example, a user interface 112 and an image processing module 114.

In some embodiments, as will be described in further detail with respect to FIGS. 2, 3 and 4, the computing device 110 is configured to generate one or more groups of images 130, 132, 134. Each group of images 130, 132, 134 includes one or more images of a particular person. For example, Group A 130 includes images of Person A, Group B 132 includes images of Person B, and so forth. Additionally, each group of images 130, 132, 134 can include a representative image 140, 142, 144 selected from the respective group 130, 132, 134. Each representative image 140, 142, 144 is an image of the same person in group. While generally only one person appears in each of the representative images 140, 142, 144, in some cases one or more additional people may also appear in any of these images.

The computing device 110 can be configured to execute any of a number of operating systems, such as Microsoft Windows®, Mac OS®, Google Android® and any one of the Linux®-based operating systems. The computing device 110 can be implemented with any suitable computing device, such as a laptop, desktop, tablet computer, smartphone, or other suitable computing device capable of receiving input from a user and providing a GUI via the display. The image database 120 can be implemented, for example, with any suitable type of memory, such as a disk drive included in, or otherwise in communication with, the user interface 112 and/or the image processing module 114. Other suitable memories include flash memory, random access memory (RAM), a memory stick or thumb drive, USB drive, cloud storage service, etc. In a more general sense, any memory facility can be used to implement the data storage. Such a system 100 may be suitable, for example, for selecting a representative image from a group of digital images using techniques as variously described herein. The system 100 may include additional components and still fall within the scope of the disclosed embodiments.

It will be appreciated that, in some embodiments, various functions and data transformations performed by the user interface 112, and the image processing module 114, as described herein, can be performed by similar processors and/or storage devices in different configurations and arrangements, and that the depicted embodiments are not intended to be limiting. Various components of this example embodiment can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent. Various components of the system shown in FIG. 1, such as the user interface 112 and the image processing module 114, can be implemented in software, such as a set of instructions (e.g. C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided herein to be carried out. In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described herein. In a more general sense, any suitable combination of hardware, software, and firmware can be used, as will be apparent.

Example Methodology

Figure 2:
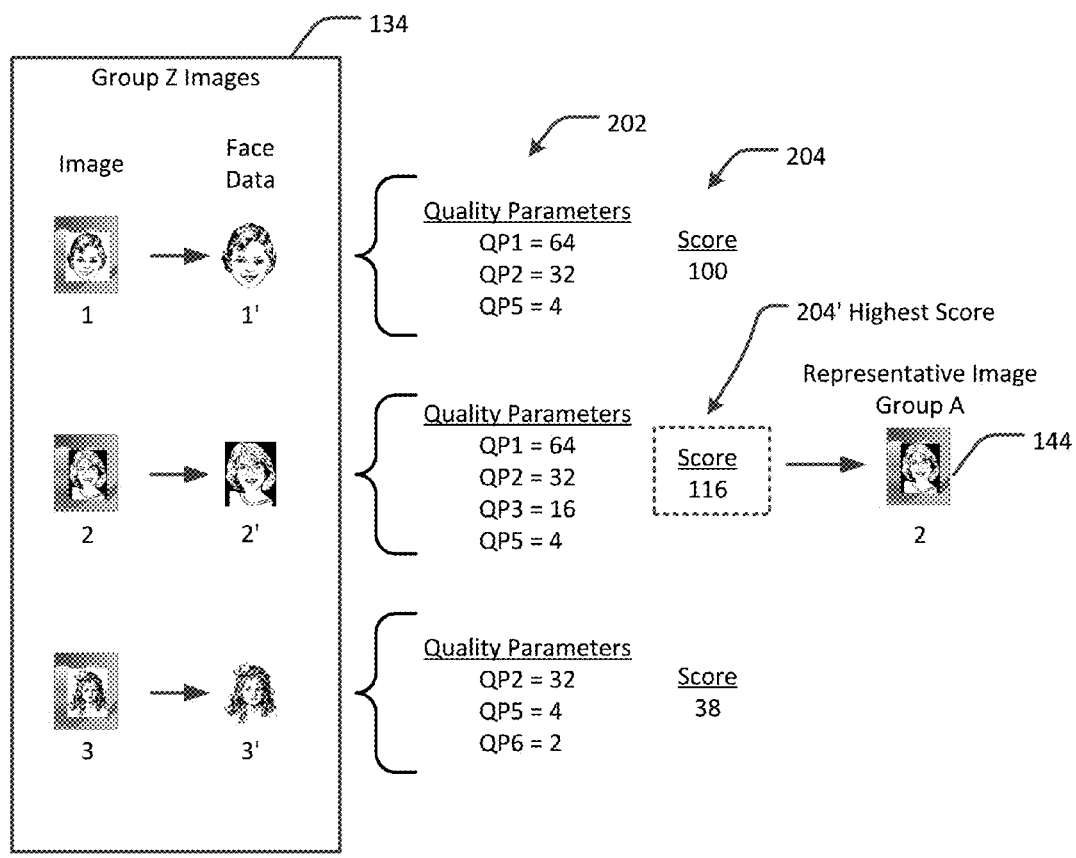
FIGS. 2 and 3 show an example methodology for selecting a representative image from a group of digital images, in accordance with an embodiment of the present disclosure.
Figure 3:
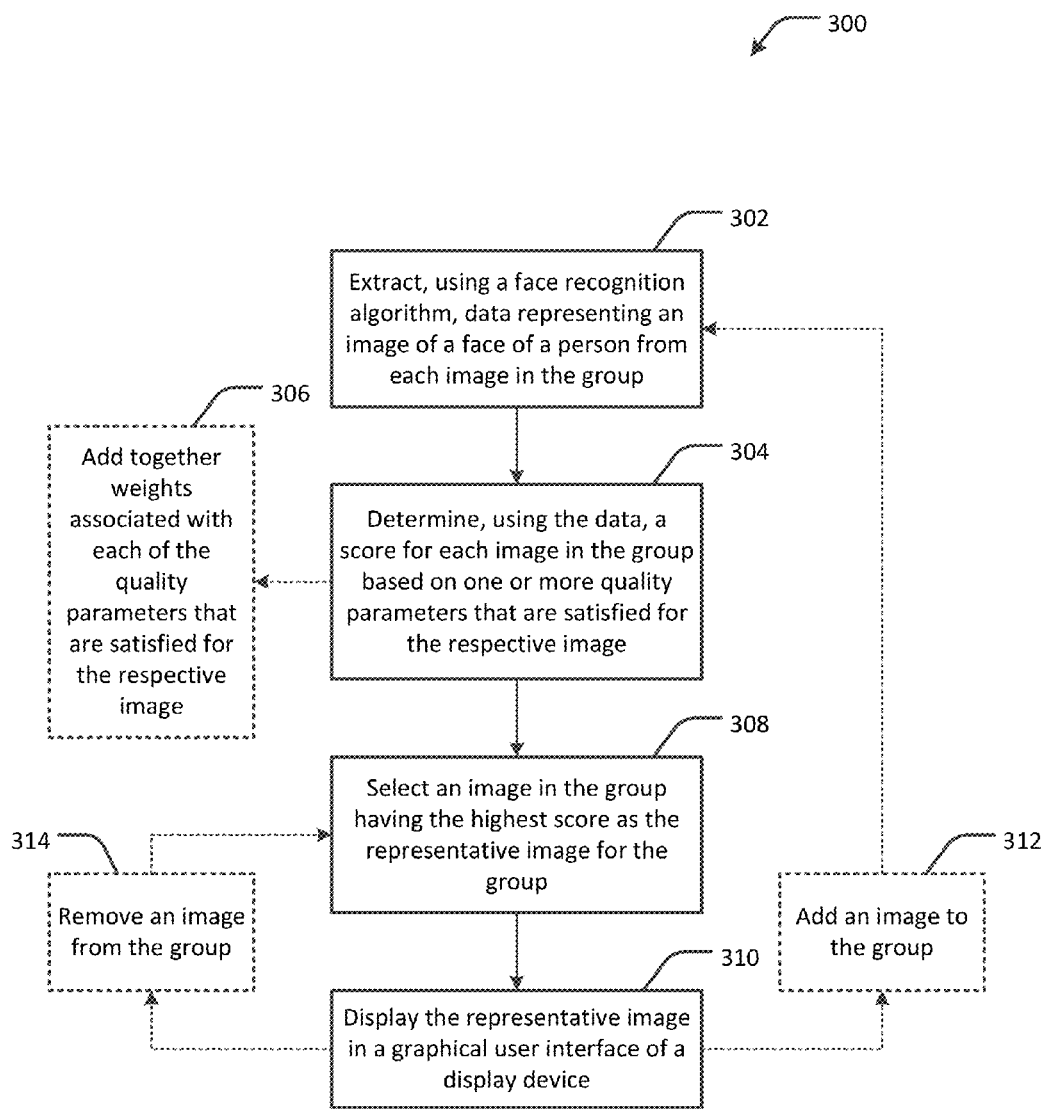
Figure 4:
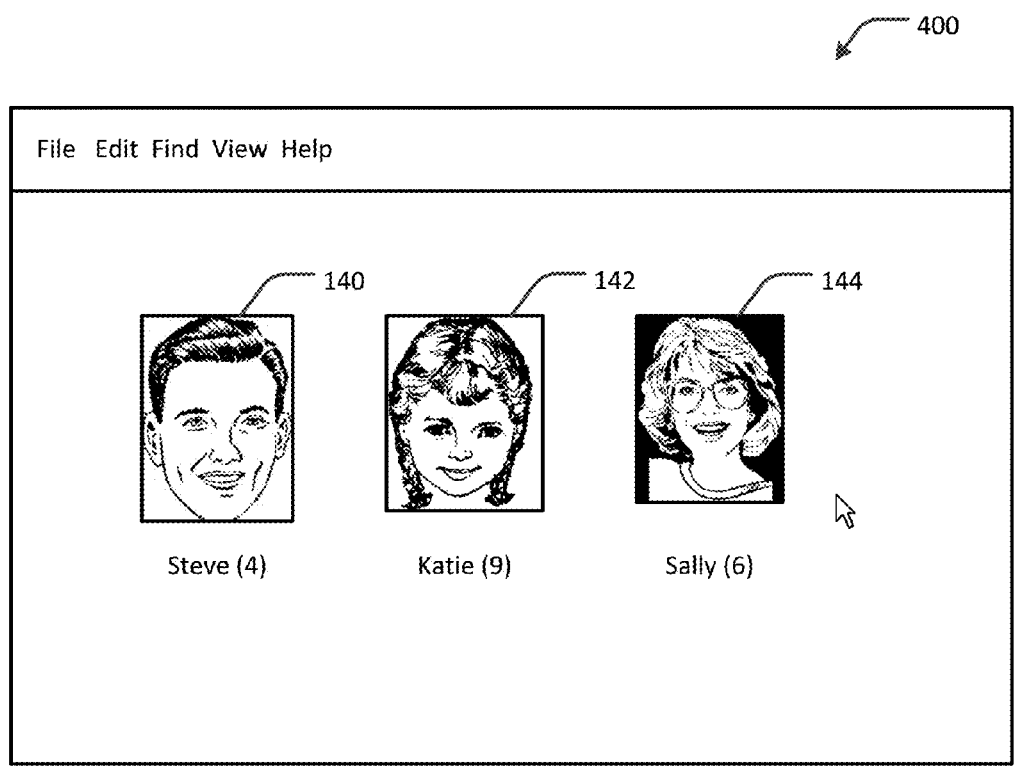
FIG. 4 is an example graphical user interface for user interaction with a group of digital images, in accordance with an embodiment of the present disclosure.

FIGS. 2 and 3 show an example methodology 300 for selecting a representative image from a group of digital images, in accordance with an embodiment of the present disclosure. The methodology 300 may be implemented, for example, in the computing device 110 of FIG. 1, and more particularly, by the user interface 112 and/or the image processing module 114. As noted above with respect to FIG. 1, each group of images 130, 132, 134 can include a representative image 140, 142, 144. For explanatory purposes, the example process will be described with respect to one group of images (e.g., Group Z 134) and images 1, 2 and 3 within the group. However, it will be understood that a similar process can be applied to any group of images for selecting representative images in each group.

Referring to FIG. 3, the methodology 300 begins by extracting 302 data representing an image of a face of a person (or multiple faces, if present) from each image in the group. The data may, for example, be extracted using a face recognition algorithm, although it will be understood that other techniques, such as a manual selection of pixels by the user, may be effectively used. In FIG. 2, the extracted image data is shown as face data 1', 2' and 3' for each image 1, 2 and 3. The face data 1', 2' and 3' do not necessarily include portions of the image that do not represent the face, such as the background, shoulders, arms, torso or hair. Generally, only portions of the image containing the face are used to select the representative image from the group, even though the entire image or other portions of the image may be displayed to the user. For example, in one embodiment, the data extracted from each image represents only the face or faces of people in the images, and not other portions of the image (e.g., background, torso, etc.).

Next, a score is determined 304 for each image in the group based on one or more quality parameters 202 (e.g., QP1, QP2, etc.) that are satisfied for the respective image. Examples of quality parameters include, but are not limited to: image exposure is good; color/gray scale profile; eyes of subject are open; mouth of the person is closed; the person is wearing eyeglasses; the person is wearing a hat; the person is facing a camera; the entire face of the person is visible; focus of the image the image is good; sharpness of facial features in the image is good; image resolution is high; age of the image is low; and only one face appears in the image. However, additional or alternative parameters may be used. With respect to whether a parameter is 'good' or not, note that the term good refers to an established threshold for that parameter, such that a measure or determination of 'good' is achieved if that threshold is met or otherwise exceeded. The threshold may be set, for example, based on known standards of acceptability, user preference, or some other value suitable means. For instance, exposure can be computed from exposure value and scene luminance in a specified region of the image and can thus be assigned an established threshold (e.g., based on the sunny day rule or some other appropriate such standard). Gray scale profile, on the other hand, can be characterized with a histogram that counts and plots the total number of pixels at each grayscale level. The histogram can then be used to determine if the overall intensity in the image meets the given intensity threshold. There are numerous other ways to qualify gray scale profile of an image, any of which can be used, as will be appreciated in light of this disclosure. Image resolution can be measured, for example, based on dots per square inch. In any such cases, the value of such parameters may be provided with the image (in metadata from camera) or measured from the photo, and that parameter value can then be compared to the given threshold.

In some embodiments, a weight may be associated with each quality parameter to define the relative importance of the parameter with respect to other parameters. Although the weight may be any value, in some embodiments each of the weights is a unique number in a sequence of numbers, such as 2, 4, 8, 16, 32, 64, 128 and 256. For example:

Good exposure (64)
Good gray scale profile (32)
Eye open best practice (16)
Only best face available (8)
Focus and facial feature sharpness (4)
Good resolution (2)

For each image in the group, the quality parameters are resolved to a logical 'true' or 'false' based on the image data of the faces. The score 204 for each image in the group is the sum 306 of the corresponding values for each parameter that resolves to true (false parameters have zero value). Next, among all images in the group, the images(s) with the highest weighted score 204' are candidates for selection as the representative image for the group. If there is only one image in the group having the highest weighted score, that image is selected 308 as the representative image for the group. In the example of FIG. 2, image 2 has the highest score of all the images in Group Z 134, and therefore image 2 is selected as the representative image for Group Z 134. In the event of a tie score (i.e., more than one image has the same highest weighted score), the image most recently added to the group, or alternatively the newest image in the group, is selected as the representative image for the group. The representative image for the group (e.g., representative image 144) can then be displayed 310 in a GUI, such as shown in the example GUI 400 of FIG. 4. In FIG. 4, the example GUI may display the representative image 140, 142, 144 of each group, as well as a legend that shows, among other things, the name of the person in the group of images and a number of images in the group.

In some embodiments, the methodology 300 further includes adding 312 an image to the group. When an image is added to the group, a score is determined 304 for the newly added image, and then a new representative image is selected 308 and displayed 310. The new representative image may be the newly added image if the score of the newly added image is higher than the score of the previously selected representative image. On the other hand, the new representative image may be the same representative image that was previously selected if the score of the newly added image is not higher than the score of the previously selected representative image. Any number of images may be added to the group in the manner described above.

In some embodiments, the methodology 300 further includes removing 314 an image from the group. When an image is removed from the group, a new representative image is selected 308 and displayed 310. If the previously selected representative image was removed from the group, a new representative image having the highest score among the images remaining in the group is selected and displayed. On the other hand, the new representative image may be the same representative image that was previously selected if the score of the removed image was not higher than the score of the previously selected representative image. Any number of images may be removed from the group in the manner described above.

Example Computing Device

Figure 5:
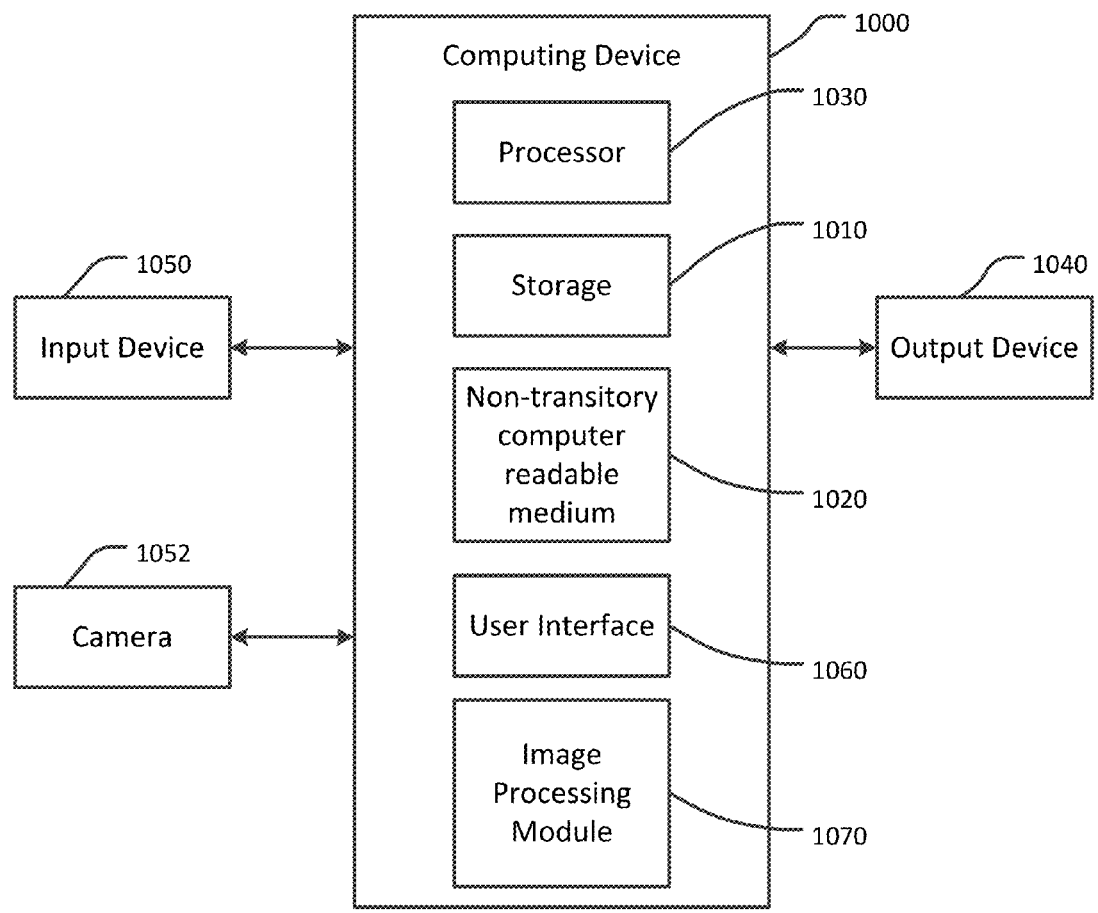
FIG. 5 is a block diagram representing an example computing device that may be used to perform any of the techniques as variously described in this disclosure.

FIG. 5 is a block diagram representing an example computing device 1000 that may be used to perform any of the techniques as variously described in this disclosure. For example, the system 100 of FIG. 1, or any portions thereof, and the methodology 300 of FIG. 3, or any portion thereof, may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals, such as a camera 1052. The computing device 1000 can include and/or be operatively coupled to various suitable devices for performing one or more of the aspects as variously described in this disclosure.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system, such as the user interface 112 (indicated at 1060), the image processing module 114 (indicated at 1070), or any combination of these, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors and/or databases in different configurations and arrangements, and that the depicted embodiments are not intended to be limiting. Various components of this example embodiment, including the computing device 1000, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described herein can be combined in any number of configurations. In one example embodiment, a computer-implemented method for selecting a representative image from a group of digital images of a same person includes extracting, using a face recognition algorithm, data representing an image of a face of the person from each image in the group; determining, using the data, a score for each image in the group based on one or more quality parameters that are satisfied for the respective image; and selecting an image in the group having the highest score as the representative image for the group. In some cases, the method includes displaying the representative image in a graphical user interface of a display device, wherein the graphical user interface is configured to provide user access to the images in the group. In some cases, the method includes adding an image to the group; extracting, using a face recognition algorithm, data representing an image of a face of the person from the newly added image; determining, using the data, a score for the newly added image based on the one or more quality parameters that are satisfied for the newly added image; and selecting, subsequent to adding the image to the group, an image in the group having the highest score as a new representative image for the group. In some cases, the method includes removing an image from the group (e.g., the image in the group having the highest score); and selecting, subsequent to removing the image from the group, an image in the group having the highest score as a new representative image for the group. In some cases, the score for each image in the group is determined by adding together weights associated with each of the quality parameters that are satisfied for the respective image. In some such cases, each of the weights is a unique number in a sequence of numbers. In some such cases, the sequence includes 2, 4, 8, 16, 32, 64, 128 and 256. In some cases, the quality parameters include image exposure is good; color/gray scale profile; eyes of subject are open; mouth of the person is closed; the person is not wearing eyeglasses; the person is not wearing a hat; the person is facing a camera; the entire face of the person is visible; focus of the image is good; sharpness of facial features is good; image resolution is high; age of the image is low; only one face appears in the image, or any combination of the preceding. In some cases, the face of the person appears in every image in the group.

In another example embodiment, a system for selecting a representative image from a group of digital images of the same person includes a storage and a computer processor operatively coupled to the storage. The computer processor is configured to execute instructions stored in the storage to perform a process and further configured to: extract, using a face recognition algorithm, data representing an image of a face of the person from each image in the group; determine, using the data, a score for each image in the group based on one or more quality parameters that are satisfied for the respective image; and select an image in the group having the highest score as the representative image for the group. In some cases, the system includes a display device operatively coupled to the computer processor and configured to display the representative image in a graphical user interface, wherein the graphical user interface is configured to provide user access to the images in the group. In some cases, the computer processor is further configured to: add an image of the person to the group; extract, using a face recognition algorithm, data representing an image of a face of the person from the newly added image; determine, using the data, a score for the newly added image based on the one or more quality parameters that are satisfied for the newly added image; and select, subsequent to adding the image to the group, an image in the group having the highest score as a new representative image for the group. In some cases, the computer processor is further configured to: remove an image from the group; and select, subsequent to removing the image from the group, an image in the group having the highest score as a new representative image for the group. In some cases, the score for each image in the group is determined by adding together weights associated with each of the quality parameters that are satisfied for the respective image. In some such cases, each of the weights is a unique number in a sequence of numbers. In some such cases, the sequence includes 2, 4, 8, 16, 32, 64, 128 and 256. In some cases, the quality parameters include image exposure is good; color/gray scale profile; eyes of subject are open; mouth of the person is closed; the person is not wearing eyeglasses; the person is not wearing a hat; the person is facing a camera; the entire face of the person is visible; focus of the image is good; sharpness of facial features is good; image resolution is high; age of the image is low; only one face appears in the image, or any combination of the preceding. In another example embodiment, a non-transitory computer program product includes instructions encoded thereon that when executed by one or more computer processors cause the one or more computer processors to perform a process as variously set forth in this paragraph.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method for selecting a representative image from a group of digital images of a particular person, the method comprising:
   extracting, by a computing device and using a face recognition algorithm, data representing a facial expression of the particular person from each image in the group;
   determining, by the computing device and using the data, a score for each image in the group based on one or more quality parameters that are satisfied for each image;
   selecting, by the computing device, an image in the group having a maximum score as the representative image for the group;
   adding, by the computing device, a new image of the particular person to the group, wherein the new image is acquired and added to the group after the representative image is selected;
   extracting, by the computing device and using the face recognition algorithm, new data representing a new facial expression of the particular person from the new image;
   determining, by the computing device and using the new data, a score of the new image based on one or more quality parameters that are satisfied for the new image;
   determining that the score for the new image is greater than the maximum score associated with the representative image; and
   selecting, by the computing device, the new image as a new representative image for the group.

2. The method of claim 1, further comprising displaying the new representative image in a graphical user interface of a display device, wherein the graphical user interface is configured to provide user access to the images in the group.

3. The method of claim 1, further comprising:
   removing, from the group and by the computing device, the image in the group having the maximum score; and
   selecting, by the computing device and subsequent to removing the image having the maximum score from the group, an image in the group having a new maximum score as a second new representative image for the group.

4. The method of claim 1, wherein the score for each image in the group is determined by adding together weights associated with each of the quality parameters that are satisfied for the respective image.

5. The method of claim 4, wherein each of the weights is a unique number in a sequence of numbers.

6. The method of claim 5, wherein the sequence includes 2, 4, 8, 16, 32, 64, 128 and 256.

7. The method of claim 1, wherein the quality parameters include at least one of:
   image exposure is good;
   color/gray scale profile;
   eyes of subject are open;
   mouth of the particular person is closed;
   the particular person is not wearing eyeglasses;
   the particular person is not wearing a hat;
   the particular person is facing a camera;
   an entire face of the particular person is visible;
   focus of the image is good;
   sharpness of facial features is good;
   image resolution is high;
   age of the image is low; and
   only one face appears in the image.

8. A system for selecting a representative image from a group of digital images of a particular person, the system comprising:
   a storage; and
   a computer processor operatively coupled to the storage, the computer processor configured to execute instructions stored in the storage to perform a process that comprises:
      extracting, using a face recognition algorithm, data representing a facial expression of the particular person from each image in the group;

determining, using the data, a score for each image in the group based on one or more quality parameters that are satisfied for each image;

selecting an image in the group having a maximum score as the representative image for the group;

adding a new image of the particular person to the group, wherein the new image is acquired and added to the group after the representative image is selected;

extracting, using the face recognition algorithm, new data representing a new facial expression of the particular person from the new image;

determining, using the new data, a score of the new image based on one or more quality parameters that are satisfied for the new image;

determining that the score for the new image is greater than the maximum score associated with the representative image; and selecting the new image as a new representative image for the group.

9. The system of claim 8, further comprising a display device operatively coupled to the computer processor and configured to display the new representative image in a graphical user interface, wherein the graphical user interface is configured to provide user access to the images in the group.

10. The system of claim 8, wherein the computer processor is further configured to:

remove, from the group, the image in the group having the maximum score; and select, subsequent to removing the image having the maximum score from the group, an image in the group having a new maximum score as a second new representative image for the group.

11. The system of claim 8, wherein the score for each image in the group is determined by adding together weights associated with each of the quality parameters that are satisfied for the respective image.

12. The system of claim 11, wherein each of the weights is a unique number in a sequence of numbers.

13. The system of claim 12, wherein the sequence includes 2, 4, 8, 16, 32, 64, 128 and 256.

14. The system of claim 8, wherein the quality parameters include at least one of:

image exposure is good;
color/gray scale profile;
eyes of subject are open;
mouth of the particular person is closed;
the particular person is not wearing eyeglasses;
the particular person is not wearing a hat;
the particular person is facing a camera;
an entire face of the particular person is visible;
focus of the image is good;
sharpness of facial features is good;
image resolution is high;
age of the image is low; and
only one face appears in the image.

15. A non-transitory computer program product having instructions encoded thereon that when executed by one or more computer processors cause the one or more computer processors to perform a process comprising:

extracting, using a face recognition algorithm, data representing a facial expression of a particular person from each image in a group of digital images;

determining, using the data, a score for each image in the group based on one or more quality parameters that are satisfied for each image;

selecting an image in the group having a maximum score as the representative image for the group;

adding a new image of the particular person to the group, wherein the new image is acquired and added to the group after the representative image is selected;

extracting, using the face recognition algorithm, new data representing a new facial expression of the particular person from the new image;

determining, using the new data, a score of the new image based on one or more quality parameters that are satisfied for the new image;

determining that the score for the new image is greater than the maximum score associated with the representative image; and selecting the new image as a new representative image for the group.

16. The non-transitory computer program product of claim 15, wherein the process further comprises displaying the new representative image in a graphical user interface of a display device, wherein the graphical user interface is configured to provide user access to the images in the group.

17. The non-transitory computer program product of claim 15, wherein the score for each image in the group is determined by adding together weights associated with each of the quality parameters that are satisfied for the respective image.

* * * * *